(12) United States Patent
Izadnegahdar

(10) Patent No.: US 7,042,230 B1
(45) Date of Patent: May 9, 2006

(54) MULTI-PARAMETER SENSING SYSTEM

(75) Inventor: Alain Izadnegahdar, 130 Murcott Cir., Orange, OH (US) 44022

(73) Assignees: Alain Izadnegahdar; ZIN Technologies

( * ) Notice: Subject to any disclaimer, the term of this patent is extended or adjusted under 35 U.S.C. 154(b) by 0 days.

(21) Appl. No.: 11/069,801

(22) Filed: Feb. 28, 2005

(51) Int. Cl.
 *G01R 27/02* (2006.01)
(52) U.S. Cl. .................... 324/609; 324/674; 73/861.42
(58) Field of Classification Search ..................... None
 See application file for complete search history.

(56) References Cited

U.S. PATENT DOCUMENTS

| | | | |
|---|---|---|---|
| 3,421,374 A * | 1/1969 | Lawrence et al. | 374/184 |
| 4,016,763 A | 4/1977 | Grindheim | |
| 4,250,490 A | 2/1981 | Dahlke | |
| 4,311,053 A | 1/1982 | Cucci | |
| 4,535,638 A | 8/1985 | EerNisse et al. | |
| 5,157,452 A * | 10/1992 | Suzuki et al. | 356/128 |
| 5,458,000 A | 10/1995 | Burns et al. | |
| 5,772,322 A | 6/1998 | Burns et al. | |
| 6,124,806 A * | 9/2000 | Cunningham et al. | 340/870.02 |
| 6,207,470 B1 | 3/2001 | De Bortoli | |
| 6,279,405 B1 * | 8/2001 | Clark et al. | 73/861.42 |
| 6,299,349 B1 | 10/2001 | Steinel et al. | |
| 6,557,419 B1 | 5/2003 | Herb et al. | |
| 6,584,864 B1 | 7/2003 | Greenwood | |
| 2004/0226386 A1 * | 11/2004 | Gysling et al. | 73/861.42 |

OTHER PUBLICATIONS

C. J. Welham et al., "A Laterally Driven Micromachined Resonant Pressure Sensor", 8th International Conference on Solid-State Sensors & Actuators, and Eurosensors IX, Jun. 25-29, 1995, pp. 586-589, Sweden.
A. Seshia et al., "Micromechanical Pierce Oscillator for Resonant Sensing Applications", Modeling & Simulation of Microsystems, 2002, pp. 162-165, no month available.
K. E. Wojciechowski et al, "MEMS Resonant Strain Sensor Operated in Air", IEEE. 2004, pp. 841-845, no month available.

* cited by examiner

*Primary Examiner*—Vincent Q. Nguyen
(74) *Attorney, Agent, or Firm*—Seyed Vahid Sharifi Takieh Amin & Turocy, LLP

(57) ABSTRACT

Systems and methodologies that provide for multi-parameter sensing via micro fabricated sensing structures operatively connected to oscillators, each micro-fabricated sensing structure in part defines a frequency of a respective associated oscillator. Output from such oscillators can be combined together, and then AC coupled with an incoming DC voltage that feeds the oscillators. The wiring arrangement includes two conducting paths/wires that carry a direct current to the oscillators as well as outputting the combined signal to external measurement devices. In addition, arrangements for pressure sensors are provided that mitigate errors from temperature variations and the induced stress/strains.

17 Claims, 7 Drawing Sheets

MULTI-PARAMETER SENSING SYSTEM

GOVERNMENT INTERESTS

This subject invention has been developed with government support under Contract No. DMI-0321616 awarded by National Science Foundation (NSF). The United States government may have certain rights in the invention.

TECHNICAL FIELD

The subject invention relates generally to sensors, and in particular to a micro-fabricated sensor system with a two wire arrangement, namely: a signal wire that carries a direct current to electrical oscillators of a sensing system, and a ground wire that functions as a return path for closing a typical electrical circuit. Such an arrangement carries direct current to electrical oscillators of the sensing system, while simultaneously outputting combined signals from such oscillators to external measurement analyzing device(s).

BACKGROUND OF THE INVENTION

Sensors are typically employed in a wide array of industrial applications for the measurement of various physical parameters, e.g. pressure and temperature. Such sensors often rely on variance of a physical property that is measured by a sensing element, and then correlated to a value of the desired parameter by measurement or analyzer units. For example, pressure and temperature sensors often rely on the transmission of strain from an elastic structure (e.g., a diaphragm, bellows, and the like) to the sensing element.

For such sensors, errors in measurement may occur if properties other than those intended influence the measured properties. For example, temperature stresses/strains induced in the diaphragm of a pressure sensor from an attachment surface can adversely affect accuracy of the pressure measured with such sensor. Likewise, as a result of the mismatch created by the differences in the coefficients of thermal expansion for the sensor and its packaging, undesirable thermo-mechanical stresses can also be induced on the sensor element. As such, packaging components having material properties different than the sensors that they carry can also affect measurement reliability.

Moreover, in general the long term stability of the sensor attachment to the associated structure is also important, since attachment of a typical sensing element to another structure with high temperature variation can in general contribute to a large source of error, when the attachment is not highly stable. Accordingly, a major source of such long term sensor instability can be effect of other undesired parameters, such as temperature changes and the ensuing stress/strain on the sensing element from sources other than those being measured. Such can typically result in a permanent shift or drift error in the sensor signal output, and create inaccurate measurements.

At the same time, typical electronics and their associated sensitive devices cannot be placed in close proximity to the harsh environments, wherein the required parameters are actually acquired—(e.g., high temperature, pressure that exist within an engine, turbine and the like)—since exposure to such harsh environment can prevent correct operation or cause permanent damage of electronic circuitry. Accordingly, wiring arrangements can in general be required to transfer a signal resulting from measurements in the "Hot Zone", to an analyzer device placed in normal room temperature or a "Cold Zone". Such wirings can add to complexities of a sensing system and at the same time increase costs associated with installations, as well as interfacing costs and interconnect procedures with other devices.

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention provides for systems and methods of multi-parameter sensing, via micro fabricated sensing structures that can in part define frequency of electronic oscillators operatively connected thereto, wherein output from such oscillators can be combined together, and then alternating current coupled (AC coupled) with an incoming DC voltage that powers the oscillators. The wiring arrangement of the subject invention can include a two-wire combination (e.g., two conducting paths, two wires, and the like) that carries a direct current to the oscillators, and outputs the combined signal to external measurement devices. This wiring arrangement, in general operates via a combination of signal wire that functions in conjunction with a second wire that acts as a return path to close a typical electrical circuit. Such an arrangement can facilitate wiring from the harsh measurement environment of sensing elements, to external measurement analyzer units, for example via a two wire co-axial cable that has low sensitivity to external environmental noise, and provides for an efficient implementation.

In a related aspect of the subject invention, a plurality of sensors are operationally connected to a plurality of oscillators with frequencies that can vary, in part based on variation in measured parameters. Output signals from the oscillators can then be combined by a mixer to form a combined signal (e.g., a combined alternating signal). Such combined signal can then be AC coupled with an incoming DC that supplies power to the plurality of oscillators. The coupling of the mixed signal with the incoming DC can simplify circuit design, wherein the two wiring combination can output the mixed signal to an external measurement device, while simultaneously supply power to the oscillators. Additionally, a low pass filter can be provided to prevent (or mitigate) a return of the mixed signal to power inputs of the oscillators. Like wise, a capacitor can be supplied as part of the circuit design of the subject invention to prevent the DC to be directed to an output of the mixer.

In a further aspect of the subject invention, a pressure sensor can be connected to a package, such that the contact area therebetween is less than the area at base of the sensor. For example to reduce the contact area with the package, a step shaped structure can be formed as part of the sensor base, to form a typically free expanding member with the sensing element placed thereon. Such step shaped structure reduces a contact area with the package, to mitigate effect of stress due to temperature variations on the pressure sensing element. As such, the resulting free expanding member can typically expand/contract beneath the pressure sensing element during temperature changes. The free expanding member can be fabricated from a single material type. Accordingly, the single coefficient thermal expansion of the expanding member can provide a zone, wherein induced temperature stresses/strains are typically absorbed and/or primarily manifested therein, and thus stress/strain inducement on the pressure sensing element can be mitigated. The pressure sensor can operate based on piezoresistive, capacitive and/or resonant structures.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION OF THE INVENTION

Figure 1:
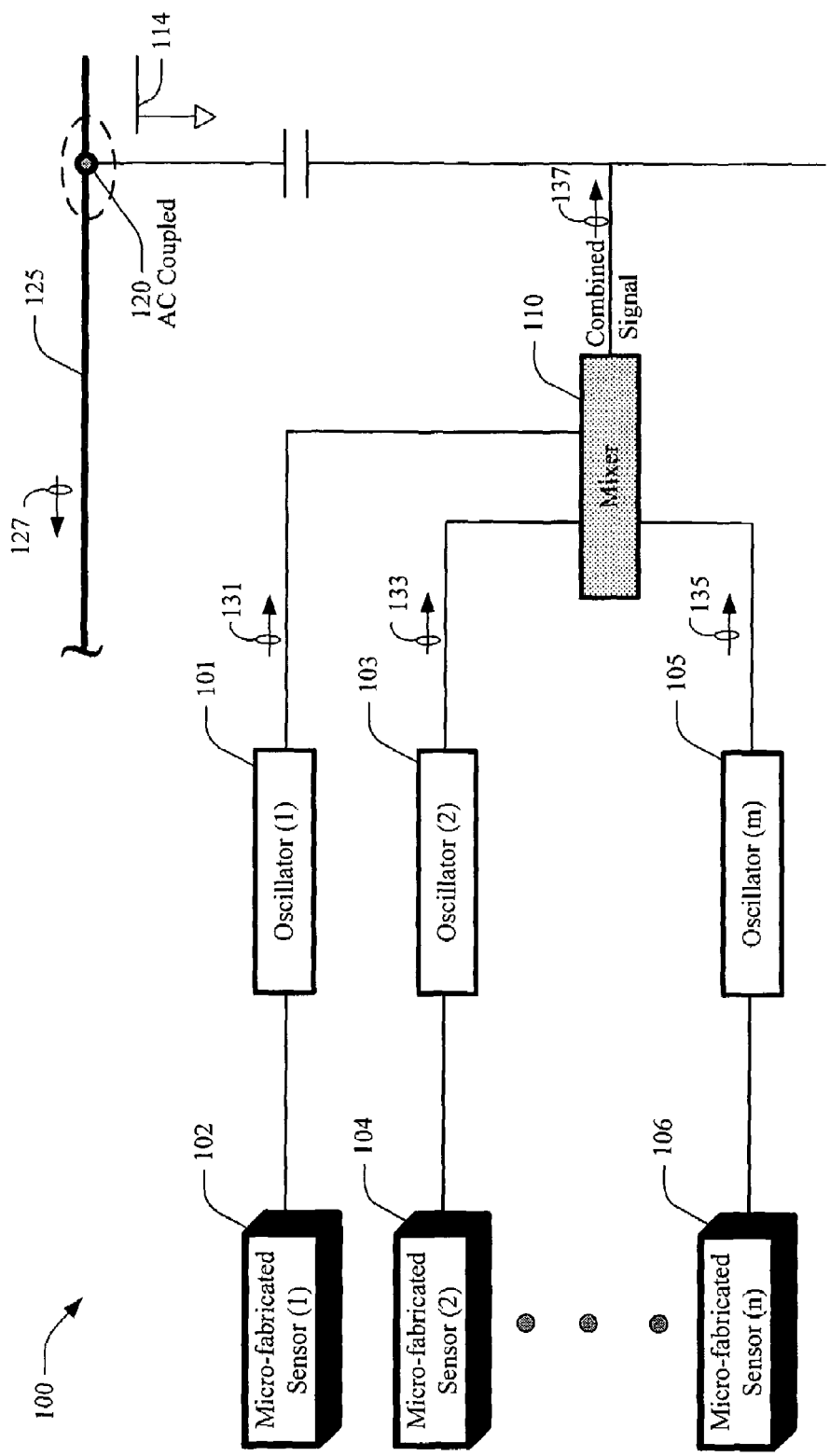
FIG. 1 illustrates a schematic block diagram of a multi-parameter sensing system in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Referring initially to FIG. 1, there is illustrated a schematic block diagram of a multi-parameter sensing system 100 in accordance with an aspect of the subject invention. A plurality of micro-fabricated sensors 102, 104, 106 (1 thru n, where n is an integer) are provided to measure various desired parameters, such as temperature, pressure, speed of chemical reaction and the like. The micro-fabricated sensors can be fabricated from materials such as single crystal or polycrystalline silicon, silicon carbide, silicon nitride, diamonds and the like materials that can tolerate high temperature and pressure.

Such micro fabricated sensors 102, 104, 106 are positioned in a feedback path of electronic oscillator(s) 101, 103, 105 (1 thru m, where m is an integer), wherein at least two outputs (e.g., the three outputs 131, 133, 135 from the oscillator(s) 101, 103, 105) can be combined together via a mixer 110 to form a combined signal 137, and then alternating current coupled (AC coupled) at 120 with an incoming DC voltage 127 that feeds the oscillators 101, 103,105. Such oscillators can be a Colpitts, Pierce, Hartly, and the like oscillators. The oscillation frequency of each oscillator 101, 103, 105 can depend on a physical parameter that a respective sensor can measure.

The wiring arrangement includes a single wire 125 that carries the direct current 127 to the oscillators 101, 103, 105, as well as outputting the combined signal 137 to external measurement devices. Such wire 125 is combined with a second wire 114 that functions as a return path to close a typical electrical circuit. Such an arrangement can facilitate wiring from the harsh measurement environment to external measurement units (not shown), for example via a two wire co-axial cable, which can have low sensitivity to external noise.

Figure 2:
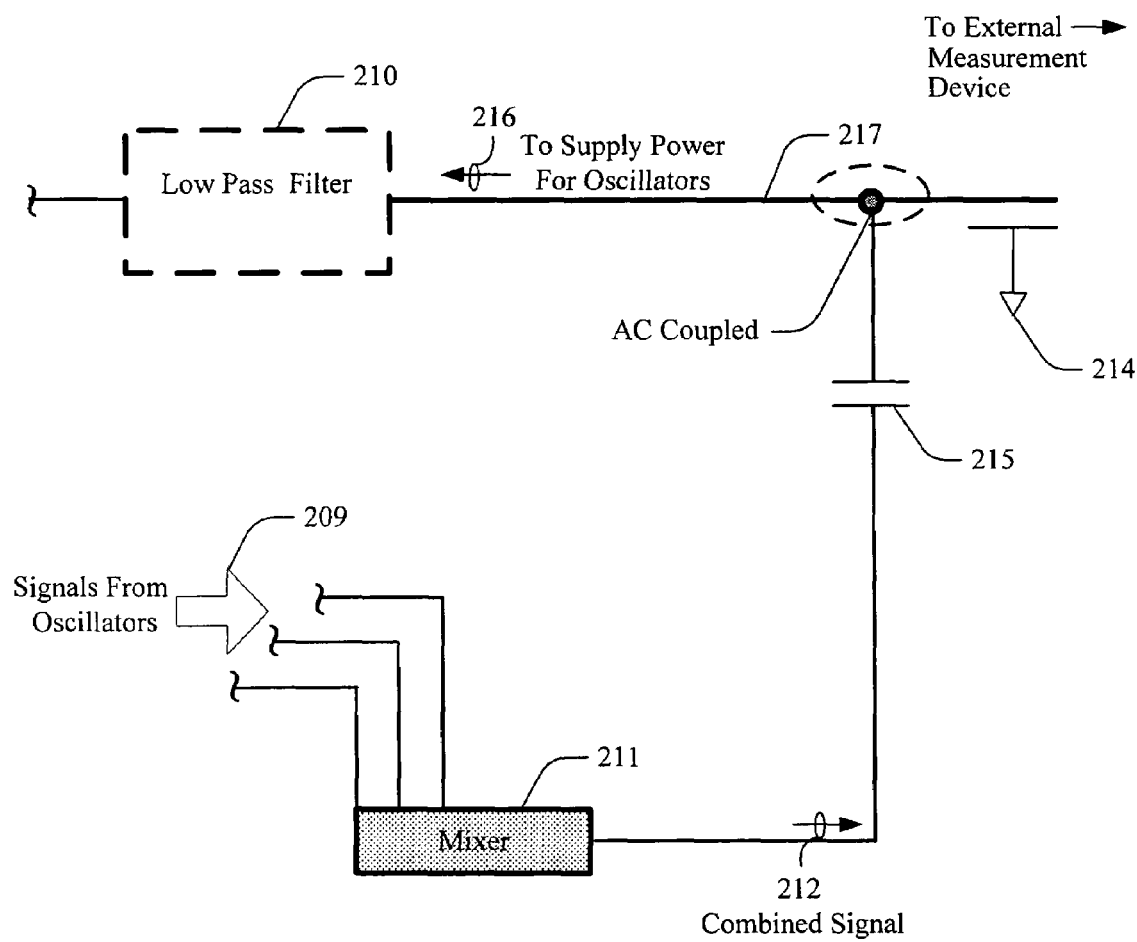
FIG. 2 illustrates an exemplary alternating current (AC) coupling in accordance with an aspect of the subject invention.

FIG. 2 illustrates a circuit arrangement for transferring the mixed signal formed from combining output from at least two of the oscillators, to an external measurement or analyzer device (not shown), in accordance with an aspect of the subject invention. As explained in detail infra, a plurality of signals 209 outputted from the oscillators are directed to a mixer 211. The mixer 211 can mix such signals, to form a combined signal 212 that is AC coupled with signal 216. The capacitor 215 prevents the DC power current 216 to be directed to an output of the mixer 211. Like wise, the Low Pass Filter 210 can prevent (or mitigate) a returning of the combined signal 212 to power inputs of the oscillators. Coupling such combined signal 212 with an incoming DC voltage 216 can simplify circuit design via employing two wires 217 and 214 for an output to the external measurement analyzer device. Accordingly, power to the oscillators can be provided via such two wire combination, which can also carry the mixed signal to an external measurement analyzer device.

Figure 3:
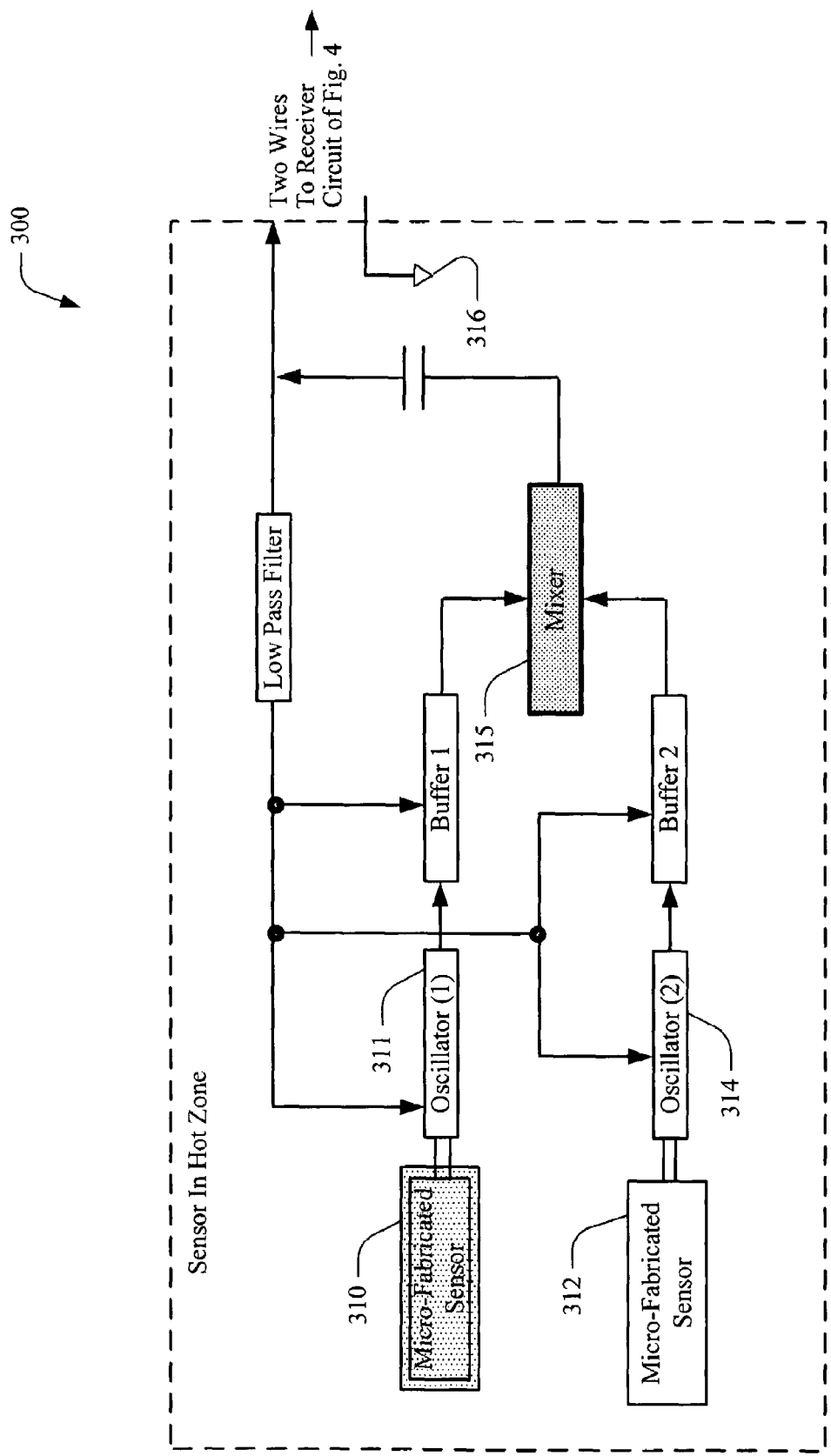
FIG. 3 illustrates a block diagram of a particular sensing system according to an aspect of the subject invention.

FIG. 3 illustrates a block diagram of a particular sensing system 300 that can function in high temperatures (300° C.–600° C.) according to an aspect of the subject invention, for measuring temperature and pressure. The sensing elements associated with micro-fabricated sensors 310 and 312 can be resonating structures or capacitors that can interact with electronic circuits that provide oscillation. For example, to measure pressure with the micro-fabricated sensor 310, at least one of a resonator or capacitor is placed on a thin diaphragm, wherein upon pressure application such diaphragm can be stretched and introduce a change in tension of the resonator or the value of capacitors. As such, the resonator can vibrate in at least one of a vertical, lateral, balanced or torsional manner, and trigger an ensuing signal.

As explained above, the system 300 includes a micro-fabricated sensor 310 that is sensitive to both pressure and temperature, and another micro-fabricated sensor 312 that is sensitive to temperature only. As such, proper temperature correction can be performed on the pressure measurement obtained by the sensor 310 that measures both temperature and pressure. The oscillation frequency of oscillator 314 depends on temperature and the oscillation frequency of oscillator 311 depends on temperature and pressure. Such frequencies of oscillators 311 and 314 are designated such that they do not typically overlap.

As illustrated in FIG. 3, the mixer 315 can mix outputs from the oscillators 311 and 314 to form a combined signal that is AC coupled with an incoming DC voltage that powers the oscillators. Put differently, the same wires that carry an incoming DC voltage for powering the oscillators can be employed to carry the combined signal to a receiver circuit associated with an external measurement unit or analyzer component.

Figure 4:
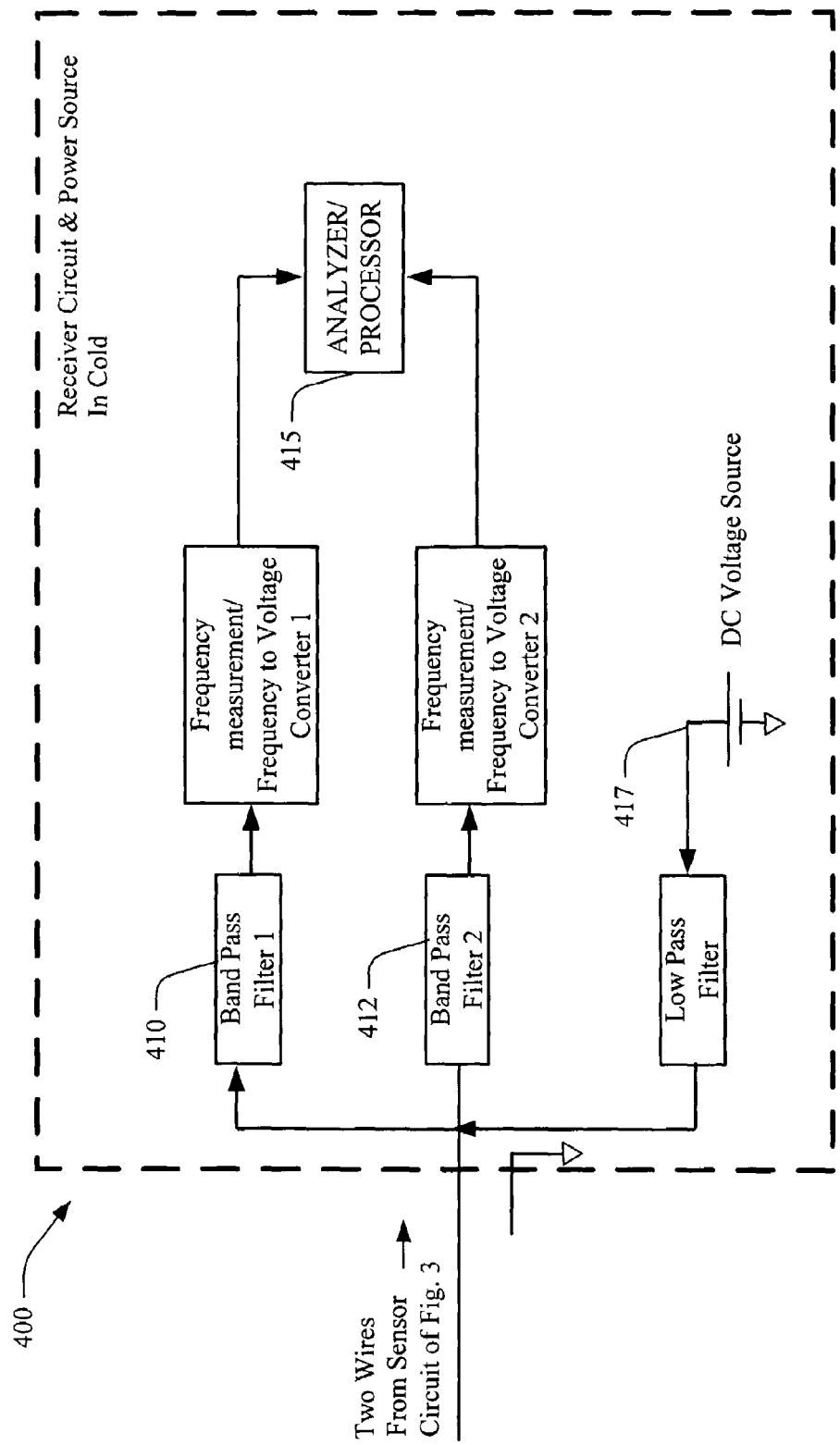
FIG. 4 illustrates a block diagram of an exemplary receiving circuit arrangement that can employ a single signal wire and a return wire for coupling of signals in accordance with an aspect of the subject invention.

Referring now to FIG. 4, such receiving circuit 400 with an external measurement analyzer unit 415 is illustrated. Receiving circuit 400 can be located away from the high temperatures where the sensor elements actually acquire the measured parameters. As such, the receiving circuit 400 can be placed in a cold zone or room temperature, and the associated electrical circuitry typically need not be high temperature resistant. Pass band filters 410, 412 can separate signals coming from the various oscillators, and direct to the requisite electronic circuitry (e.g., the analyzer 415) for frequency measurement and/or temperature correction of the measured pressure environment. A DC voltage source 417 can supply power for the oscillators that is AC coupled with output of the oscillators, as explained in detail supra.

Figure 5:
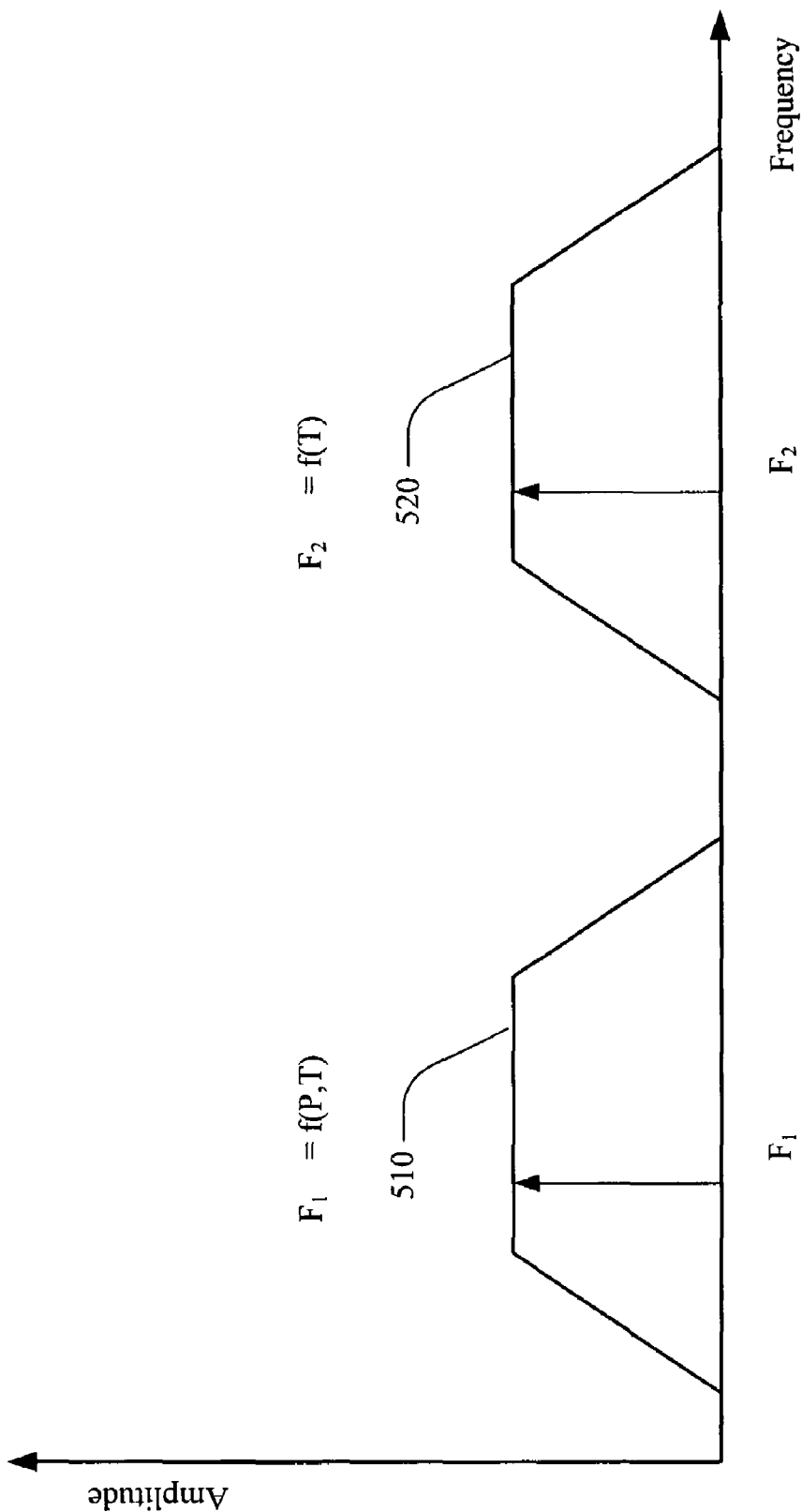
FIG. 5 illustrates output signals variation range of oscillators in frequency domain, wherein the oscillators are powered according to a wiring arrangement of the subject invention.

FIG. 5 illustrates output signals of two oscillators in frequency domain, wherein the oscillators are powered according to a wiring arrangement of the subject invention. The frequency range 510 for oscillator (1) is a function of pressure and temperature. Accordingly, a micro-fabricated sensor placed in a feedback path of such oscillator can measure both temperature and pressure. At the same time, the frequency range 520 of oscillator (2) is a function of temperature only, and a micro-fabricated sensor placed in a feedback path of such oscillator typically can only measure temperature. In general, the frequency ranges 510, 520 for such oscillators are designated such that they do not overlap. An analyzer component (not shown) can determine an accurate pressure measurement by analyzing data from both oscillators, as described in detail supra.

Figure 6:
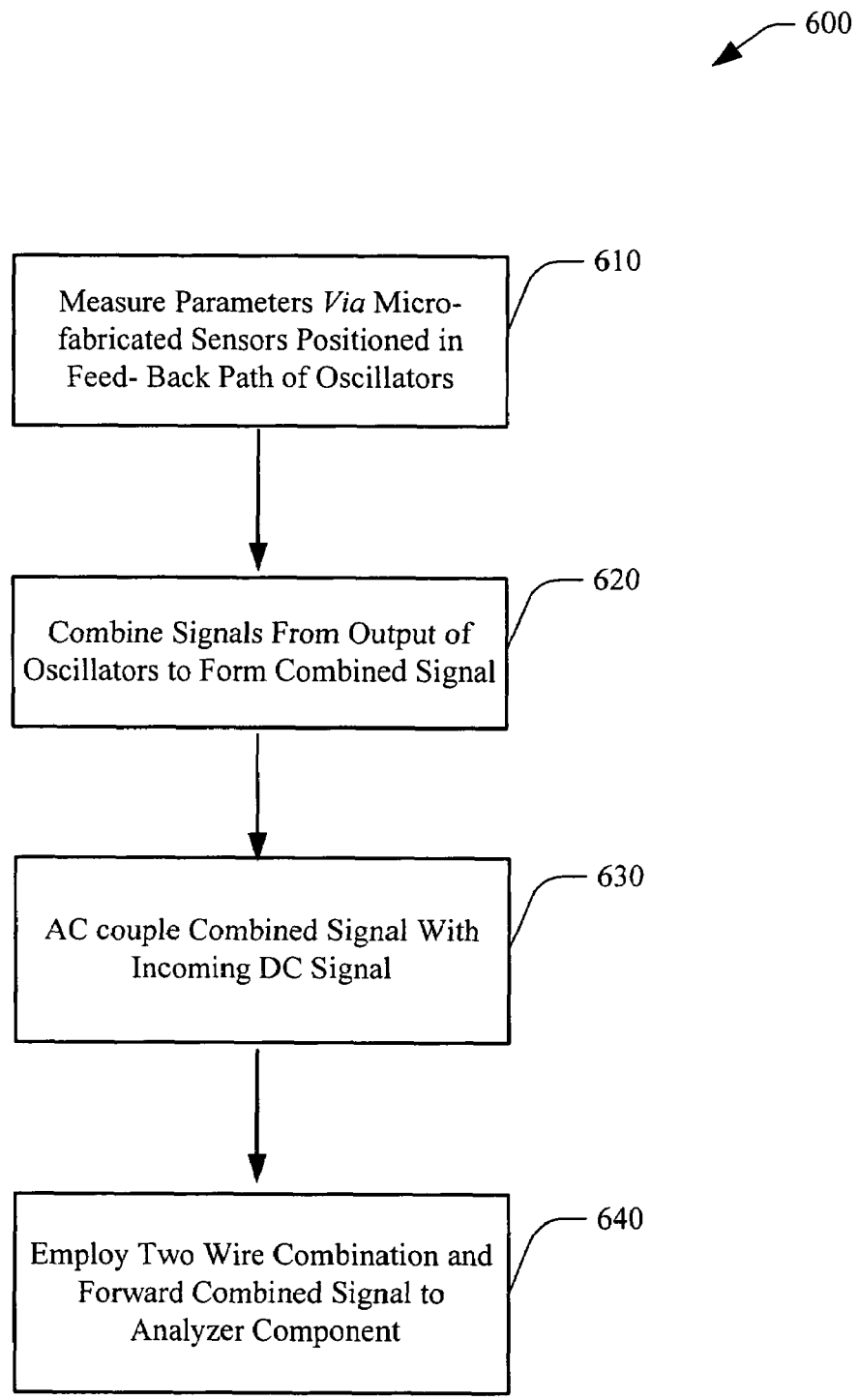
FIG. 6 illustrates a flow chart for a methodology of employing a two-wire arrangement AC coupled according to a particular aspect of the subject invention.

FIG. 6 illustrates a flow chart 600 for a methodology of employing a two-wire arrangement according to a particular aspect of the subject invention. While the exemplary method is illustrated and described herein as a series of blocks representative of various events and/or acts, the present invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the present invention. Moreover, it will be appreciated that the exemplary method and other methods according to the invention may be implemented in association with the method illustrated and described herein, as well as in association with other systems and apparatus not illustrated or described. Initially, and at 610 data associated with at least two parameters (e.g., pressure and temperature) can be measured (e.g., via a resonating technique) with micro-fabricated sensors positioned in feedback path of oscillators. Subsequently, and at 620 the output signals from the oscillators can be combined to form a combined signal. Such combined signal is then AC coupled with an incoming DC that supplies power to the oscillators, at 630. Next, and at 640 the methodology of the subject invention employs a two-wire combination to direct the combined signal to an external analyzer unit that is positioned away from the harsh environment (e.g., high pressure and temperature) of the sensing elements. As such, wiring can be facilitated via employing a co-axial cable that reduces noise, for example. It is to be appreciated that the wire arrangement of the subject invention can be employed for measuring other parameters such as, speed of reaction, and the like, and such applications are well within the realm of the invention.

Figure 7:
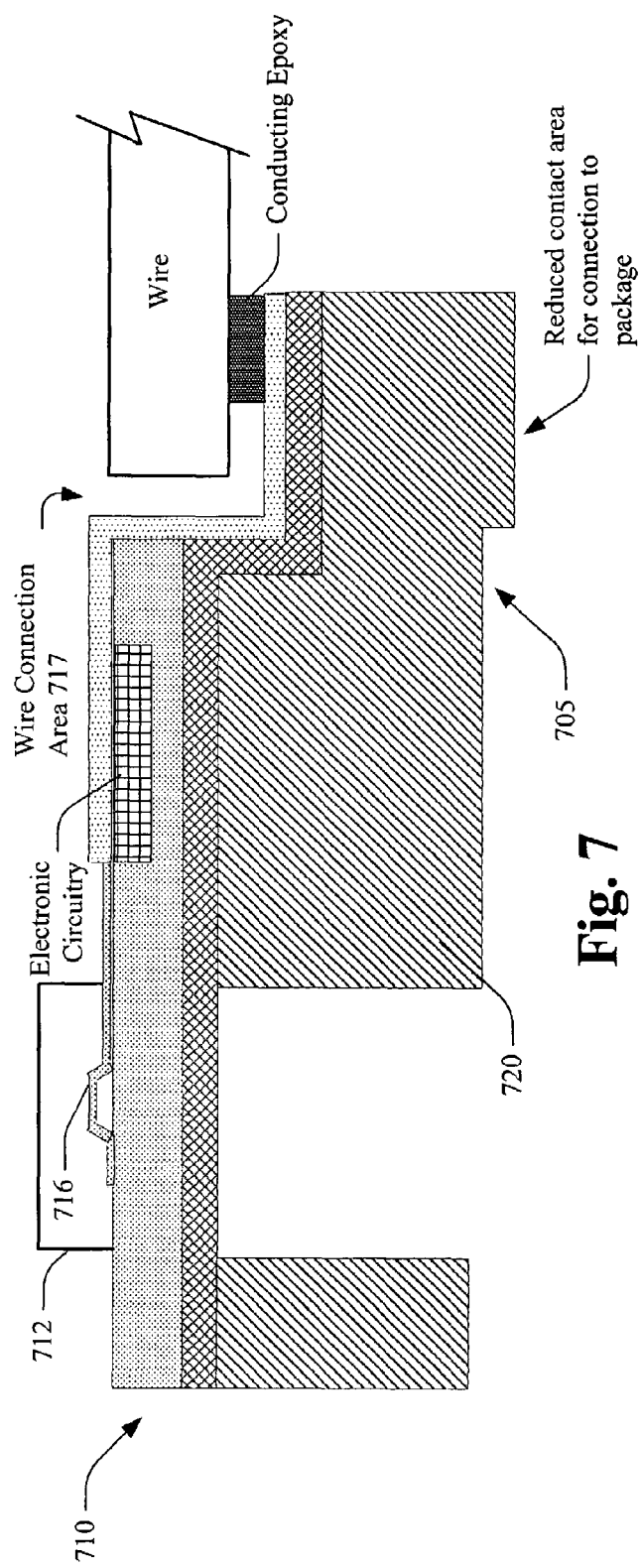
FIG. 7 illustrates a side view for a pressure sensor with a step structure that can have a free expanding member as part thereof, in accordance with an aspect of the subject invention.

FIG. 7 illustrates a side view for a pressure sensor 710, wherein the connection area between the base of the sensor and a package (not shown), is less than the area at the base of the sensor. Such an arrangement can facilitate expansion (and contraction) of the sensor, and mitigate effects of stress due to temperature variations on the pressure sensing element.

For example to reduce the contact area with the package, a step shaped structure 705 can be formed as part of the sensor base that reduces a connection area with a package, and creates a typically free expanding member 720 with the sensing element placed thereon. In general, the free expanding member 720 can freely expand (and contract) to mitigate effects of stress due to temperature variations on the pressure sensing element 716. The pressure sensor 710 can measure a relative pressure of a surrounding environment relative to the space within the encapsulation 712. Such pressure sensor 710 can employ a piezoresistive, capacitive and/or resonating pressure sensing element 716. The expanding member 720 can typically be fabricated from one material type (e.g., silicon carbide) that has a uniform coefficient of thermal expansion, to provide a zone, wherein induced temperature stresses/strains are typically absorbed and/or manifested therein—thus mitigating stress/strain inducement on the sensing element 716. Accordingly, the expanding member can expand or contract, and mitigate deformation on the sensing element 716 positioned thereupon.

It is to be appreciated that the step shaped structure is exemplary, and the free expanding member can form as a result of a connection of a base of the micro-fabricated pressure sensor to a package, such that a connection area therebetween is less than an area of the base—for example an arrangement that employs only a segment of the base area (as opposed to the whole base area), for connecting the sensor to the package. Moreover, the wire connection area 717 can accept a wire for connection to the sensor 710 in a horizontal orientation.

Figure 8:
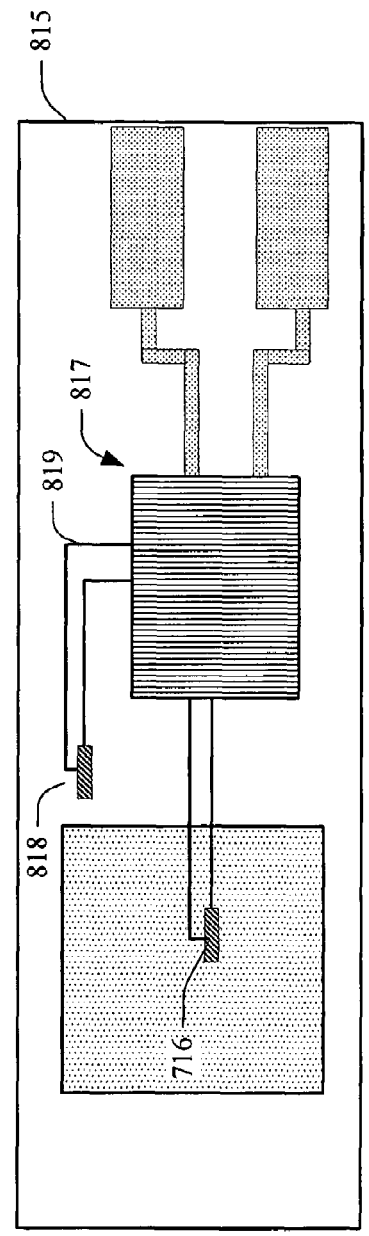
FIG. 8 illustrates a top view of the pressure sensor of FIG. 7, with an exemplary cantilever arrangement according to a particular aspect of the subject invention.

FIG. 8 illustrates a top view for the sensor 710 of FIG. 7. As illustrated, the micro-fabricated sensing element 716 operates in conjunction with a thin diaphragm, wherein upon pressure application such diaphragm can be stretched, to supply a change in tension of the resonator and/or the value of capacitors associated with the sensing element 716. As such, sensing element 716 can be sensitive to both temperature and pressure. At the same time, sensing element 818 can be merely sensitive to temperature, and is connected via conducting paths 819 to the electronic circuitry 817. The sensing element 818 can supply data for a proper temperature correction of the pressure measurement, which is obtained by the sensor 716.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A multi-parameter sensing system comprising:
a plurality of micro-fabricated sensing structures operatively connected to electronic oscillators, each micro-fabricated sensing structure in part defines a frequency of a respective associated oscillator, and
a mixer that combines outputs from at least two of the electronic oscillators to form a combined alternating signal, the combined alternating signal coupled (AC coupled) with an incoming DC voltage on a two wire combination, the incoming DC voltage feeds power to the electronic oscillators, the two wire combination carries the incoming DC voltage and outputs the combined alternating signal to external measurement analyzer device(s), the combined alternating signal separable to each of the outputs from the at least two of the electronic oscillators by the external measurement analyzer device(s).

2. The multi-parameter sensing system of claim 1, the two wire combination employs a co-axial wiring arrangement.

3. The multi-parameter sensing system of claim 1 further comprising a low pass filter that prevents the combined alternating signal to be directed to power inputs of the at least two of the electronic oscillators.

4. The multi-parameter sensing system of claim 1 further comprising a capacitor that prevents the incoming DC voltage to be directed to output of the mixer.

5. The multi-parameter sensing system of claim 1 the micro-fabricated sensing structures operate in a temperature range of about 300° C. to 600° C.

6. The multi-parameter sensing system of claim 1, the oscillators are at least one of a Colpitts, Pierce, and Hartly Oscillators.

7. The multi-parameter sensing system of claim 1, further comprising a micro-fabricated sensor that is sensitive to temperature and pressure.

8. The multi-parameter sensing system of claim 7 further comprising a buffer operationally connected between outputs of oscillators and inputs of the mixer.

9. The multi-parameter sensing system of claim 7, the multi-parameter sensing system employs two wires for a connection thereof, to an external measurement unit or analyzer component that measures or analyzes a frequency of the combined alternating signal.

10. The multi-parameter sensing system of claim 7, further comprising a resonator that vibrates in at least one of a vertical, lateral, balanced and torsional manner.

11. A method of measuring parameters comprising:
measuring at least two parameters via micro-fabricated sensors that in part define frequency of oscillators operatively connected thereto;
combining output signals of oscillators to form a combined signal;
AC coupling the combined signal with an incoming DC on two conducting paths, the incoming DC voltage powers the oscillators on the two conducting paths, and
separating the output signals from the combined signal.

12. The method of claim 11 further comprising preventing the combined signal to be directed to power inputs of the oscillators.

13. The method of claim 11 further comprising preventing the incoming DC voltage to be directed to an output of a mixer that implements the combining act.

14. The method of claim 11 further comprising directing the combined signal to a frequency measurement unit via the two conducting paths in from of two wires.

15. A multi-parameter sensing system comprising:
sensing means for sensing a parameter, the sensing means positioned in a feedback path of a plurality of oscillators,
means for combining outputs from at least two of the plurality of oscillators to form a combined signal,
means for AC coupling the combined signal with an incoming DC voltage on two wires, the incoming DC voltage feeds the plurality of oscillators, the two wires carry the incoming DC voltage and outputs the combined signal to external measurement analyzer devices, and
means for reconstructing the outputs of the at least two of the plurality of oscillators from the combined signal.

16. The multi-parameter sensing system of claim 15 further comprising means for preventing the combined signal to be directed to power inputs of the oscillators.

17. The multi-parameter sensing system of claim 16 further comprising means for preventing the incoming DC voltage to be directed to output of the means for combining outputs from the at least two of the plurality of oscillators.

* * * * *